US009703899B1

(12) United States Patent
Mattela et al.

(10) Patent No.: US 9,703,899 B1
(45) **Date of Patent: *Jul. 11, 2017**

(54) IOT PRODUCT SYNTHESIS APPARATUS AND METHOD

(71) Applicant: Redpine Signals, Inc., San Jose, CA (US)

(72) Inventors: Venkat Mattela, San Jose, CA (US); Narasimhan Venkatesh, Hyderabad (IN); Dhiraj Sogani, Noida (IN); Apurva Peri, Hyderabad (IN)

(73) Assignee: REDPINE SIGNALS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/829,530

(22) Filed: Aug. 18, 2015

(51) Int. Cl.
*G06F 17/50* (2006.01)
*H05K 3/00* (2006.01)

(52) U.S. Cl.
CPC .......... *G06F 17/50* (2013.01); *G06F 17/5068* (2013.01); *G06F 17/5072* (2013.01); *G06F 17/5081* (2013.01); *H05K 3/0005* (2013.01); *G06F 2217/02* (2013.01)

(58) Field of Classification Search
CPC .. G06F 17/50; G06F 17/5068; G06F 17/5081; G06F 2217/02; G06F 17/5072; H05K 3/0005
See application file for complete search history.

(56) References Cited

U.S. PATENT DOCUMENTS 6,249,717 B1 * 6/2001 Nicholson ............. A61J 7/0481 222/246
2008/0120086 A1 * 5/2008 Lilley ..................... G06F 17/50 703/21
2011/0066992 A1 * 3/2011 Sandy ................. G06F 17/5045 716/122
2011/0090541 A1 * 4/2011 Harper .................... G06F 21/32 358/474
2011/0212761 A1 * 9/2011 Paulsen ................. G06T 15/005 463/25

OTHER PUBLICATIONS

Ismail et al., Optimization of electronics component placement design on PCB using self organizing genetic algorithm (SOGA), Journal of intellectual manufacturing, (2012) 23: 883-895.*

* cited by examiner

*Primary Examiner* — Idriss N Alrobaye
*Assistant Examiner* — Ronald Modo
(74) *Attorney, Agent, or Firm* — FILE-EE-PATENTS.COM; Jay A. Chesavage

(57) ABSTRACT

A product synthesizer has a core CPU, power distribution, and a plurality of selectable interfaces, each interface having an associated schematic symbol, PCB symbol, mechanical model, power dissipation, and power requirement. A set of constraints identifies performance metrics including low power, high performance, battery or mains power, battery life, and other constraints. The product synthesizer receives as inputs the interfaces and constraints, and generates as outputs a schematic diagram, a bill of materials, a routed printed circuit board, and a solid model of an enclosure, all of which satisfy the constraints and include the identified interfaces.

13 Claims, 8 Drawing Sheets

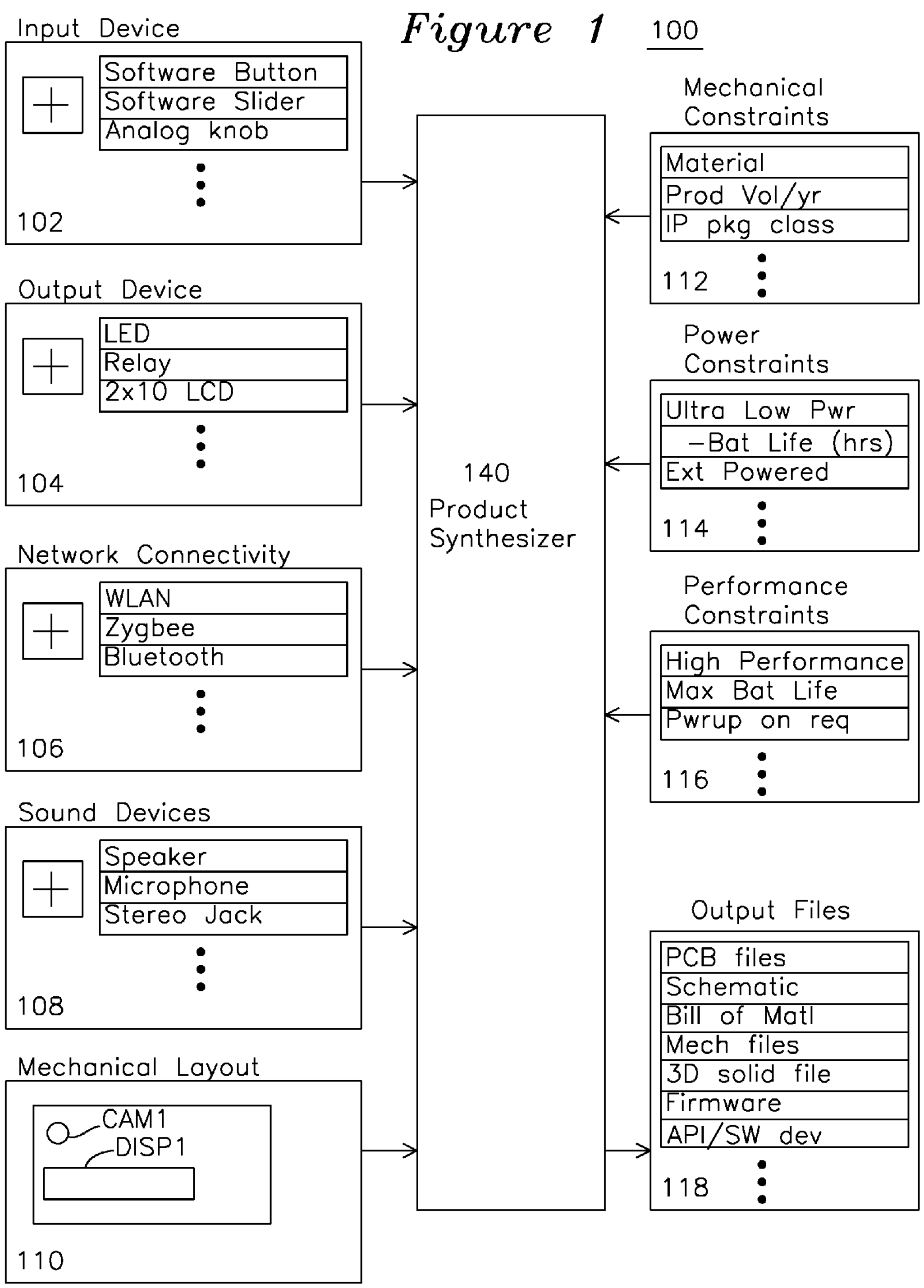

Figure 1
100
Input Device
Software Button
Software Slider
Analog knob
102
Output Device
LED
Relay
2x10 LCD
104
Network Connectivity
WLAN
Zygbee
Bluetooth
106
Sound Devices
Speaker
Microphone
Stereo Jack
108
Mechanical Layout
CAM1
DISP1
110
140
Product
Synthesizer
Mechanical
Constraints
Material
Prod Vol/yr
IP pkg class
112
Power
Constraints
Ultra Low Pwr
–Bat Life (hrs)
Ext Powered
114
Performance
Constraints
High Performance
Max Bat Life
Pwrup on req
116
Output Files
PCB files
Schematic
Bill of Matl
Mech files
3D solid file
Firmware
API/SW dev
118

Core Components

WLAN Components 260

Figure 4A

Database Entries

| Comp | Sch Sym | PCB Sym | Mech Model | V1@I1 | V2@I2 | Intfc_1 reqmt | Intfc_2 reqmt |
|---|---|---|---|---|---|---|---|

Figure 4B

Alternative 1

| | | | | | | | | | | |
|---|---|---|---|---|---|---|---|---|---|---|
| CPU1 | CPU1 Sch | CPU1 pcb | CPU1 mech | $12.50 | 3.3V@ 10ma | 1.8V@ 0ma | SDIO 50mbps | SPI 25Mbps | GPIO 1Mbps | |
| CAM1 | CAM1 Sch | CAM1 pcb | CAM1 mech | $3.50 | 3.3V@ 2ma | 1.8V@ 0ma | na | SPI 10Mbps | GPIO na | |
| DSP1 | DSP1 Sch | DSP1 pcb | DSP mech | $2.75 | 3.3V@ 10ma | 1.8V@ 0ma | SDIO na | I2C 25Mbps | GPIO 1Mbps | |
| WLAN1 | WLAN1 Sch | WLAN1 pcb | WLAN1 mech | $23.00 | 3.3V@ 30ma | 1.8V@ 0ma | SDIO 22Mbps | I2C 25Mbps | GPIO 1Mbps | |
| TTL | | CAM1: 640x480 | | $41.75 | 3.3V@ 52ma | 1.8V@ 0ma | | Thruput: 10Mbps | | |

Figure 4C

Alternative 2

| | | | | | | | | | | |
|---|---|---|---|---|---|---|---|---|---|---|
| CPU1 | CPU1 Sch | CPU1 pcb | CPU1 mech | $12.50 | 3.3V@ 10ma | 1.8V@ 0ma | SDIO 50mbps | SPI 25Mbps | GPIO 1Mbps | |
| CAM2 | CAM2 Sch | CAM2 pcb | CAM2 mech | $7.00 | 3.3V@ 2ma | 1.8V@ 0ma | na | SPI 1Mbps | GPIO na | |
| DSP1 | DSP1 Sch | DSP1 pcb | DSP mech | $2.75 | 3.3V@ 10ma | 1.8V@ 0ma | SDIO na | I2C 25Mbps | GPIO 1Mbps | |
| WLAN2 | WLAN2 Sch | WLAN2 pcb | WLAN2 mech | $27.00 | 3.3V@ 50ma | 1.8V@ 0ma | SDIO 22Mbps | I2C 25Mbps | GPIO 1Mbps | |
| TTL | | CAM1: 1300x732 | | $49.25 | 3.3V@ 72ma | 1.8V@ 0ma | Thruput: 22Mbps | | | |

Core system with selected Interfaces

Synthesized system

IOT PRODUCT SYNTHESIS APPARATUS AND METHOD

FIELD OF THE INVENTION

The present invention relates to the development of hardware and software for rapid product development. In particular, the invention relates to rapid development of IoT (Internet of Things) devices, where application-specific hardware including a CPU, power distribution, and hardware interfaces including WLAN interfaces is designed in a first step and runs flexible applications software which is designed in a second step using APIs which are specific to the selected interfaces and CPU.

BACKGROUND OF THE INVENTION

Product development of simple hardware systems for the internet requires a significant learning curve and significant development time and resources. A typical product development effort is an iterative process of trading off one constraint against another, and often there is little synergy from one product development to the next, as different drivers and devices may be used in each development. Typically, the development must be started afresh for each version of a particular product. Additionally, many of the issues which arise are sequentially resolved, one by one, after they arise.

In Internet of Things (IoT) development, it is often the case that a common set of core functions are needed, and the common set of functions are supplemented with application-specific interface requirements. For example, Wireless Local Area Network (WLAN) products typically require a central processing unit (CPU), flash memory, dynamic ram (DRAM), which is often provided in the CPU, a WLAN interface comprising a WLAN interface chip and an antenna. A variant of this same product may require battery power, in which case the system architecture requires a low-power CPU, and the WLAN interface chip may be from a power-savings family. Each of these development efforts then requires a mechanical package, which will be different for each design. As a result, each design requires a unique design effort and associated separate schematic generation, board layout, mechanical packaging, and software development.

Because each product development requires a unique design effort, it is desired to provide an optimized method for product development of IoT devices which automates and generates the files required for software development, printed circuit board (PCB) fabrication, assembly files including a bill of materials (BOM), and mechanical packing files in the form of 3D fabrication files for molded enclosures or 3D printing for rapid prototypes.

OBJECTS OF THE INVENTION

A first object of the invention is an apparatus for the generation of fabrication files and application program interface (API) files from identified design requirements.

A second object of the invention is a method for the generation of product fabrication files from identified design requirements, the design requirements including at least one of: interface requirements comprising at least one of an input device requirement or an output device requirement, a network connectivity requirement, a sound device requirement, a mechanical constraint, a power constraint, and a performance constraint.

SUMMARY OF THE INVENTION

A method for product development utilizes a flexible core system including a CPU chosen from a CPU family, the CPU family including a variety of programmable memory sizes, and program memory sizes, a power distribution for the CPU and interfaces, as well as performance levels and power savings levels required for the completed design. One core system may include an external power input for use with a mains power supply, and another core system may include a low-power CPU and powerdown circuitry for use with a battery having a finite lifetime before charging or battery replacement. Each core system provides interfaces such as Serial Peripheral Interface (SPI), Integrated Circuit to Integrated Circuit Communications (I2C), Secure Digital Input-Output (SDIO), general purpose input-output (GPIO) lines, or for high performance systems, the Peripheral Component Interface (PCI). The interface devices provided to the product synthesizer may all operate on a single shared interface bus (such as I2C, SPI, SDIO), or on dedicated interface busses which the CPU may provide, or by using individual GPIO lines, or by using multiplexed GPIO lines, with one set of column GPIO outputs activated one at a time, and a second set of row GPIO inputs read in parallel, and each switch element placed uniquely between a particular column line and a particular row line to resolve a switch closure in a switch matrix. The plurality of core systems which provide basic functionality required by a CPU, including power distribution, clock distribution, program memory storage, and data memory, each include support for a wide variety of interfaces, the interfaces including input devices, output devices, network connectivity devices, sound devices, and user-defined devices.

The core system includes at least one of: a battery powered variant, a low power variant, a high performance variant, and a periodically powered variant. Each of the interfaces has an associated schematic symbol, printed circuit board (PCB) symbol, mechanical profile, power consumption, power dissipation, and optional other requirements.

The present invention utilizes a set of these core systems and a series of interfaces to provide an automated system for IoT system design which provides for specifying the particular interfaces desired from a plurality of available interfaces, the identification of constraints including power constraints (such as ultra low power, low power, or externally powered), and performance constraints (high performance, tasks performed only when power is available), and mechanical constraints (mechanical size limits, production volume per year, which may determine most economical material, and any tooling required, waterproof requirements, preferred fabrication materials). Each core system and interface has an associated individual schematic symbol, PCB symbol, mechanical model, cost, interface speed, and other properties specific to each core system or interface. Optionally, the product synthesizer may iterate over several available alternative designs and present each of them as possible alternatives for the user to select.

When the interfaces are defined and the constraints are specified, the product synthesizer iteratively selects a particular CPU, power source, interfaces, and applies a weighted value to each constraint, searching for a minimized solution to the system configuration. One example embodiment for finding a minimized solution is to start with a finite set of alternates to the selected interface (each alternative having an associated schematic, interface netlist, PCB symbols for each schematic symbol, and an interface bus for interconnection to the CPU), and then remove the alternatives for each interface which are in conflict with any constraint, and then to provide cost and/or performance metrics for each alternative which satisfies the constraints. When an optimized solution is found, the output files required to realize the design are generated, including a Schematic diagram, PCB artwork and fabrication files, software API files for use in subsequent software development, and 3D prototype files for rapid fabrication of a prototype enclosure. Additional output files may include assembly instructions and a test plan which covers the functionality of the selected interfaces.

BRIEF DESCRIPTION OF THE DRAWINGS

FIG. 1 is a block diagram showing the selection of interfaces and specification of constraints.

FIG. 4A is an example database entry for a core system or an interface.

FIG. 4B is an example first alternative design provided by the product synthesis system.

FIG. 4C is an example second alternative design provided by the product development system.

DETAILED DESCRIPTION OF THE INVENTION

Figure 2A:
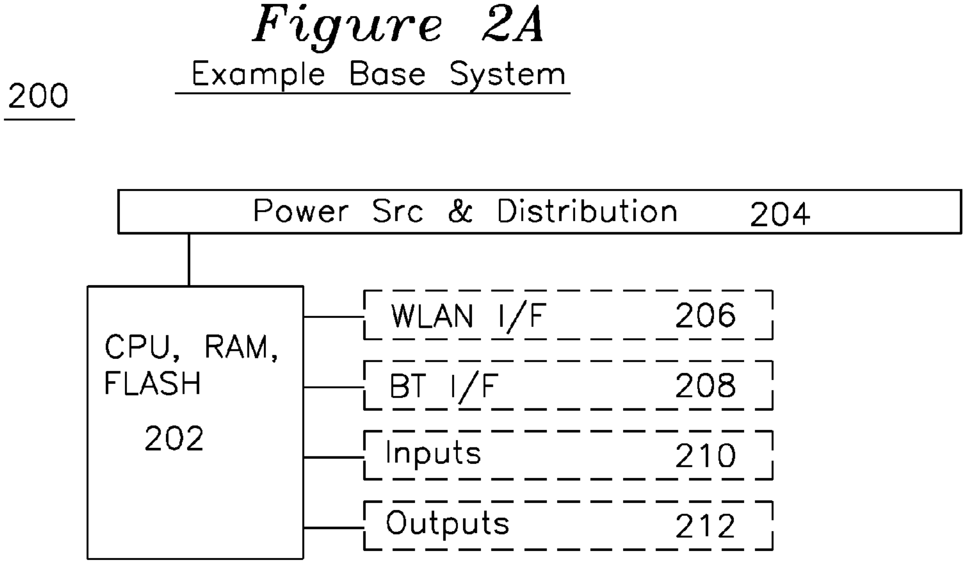
FIG. 2A is a block diagram for an example base system.

FIG. 1 shows a product development platform 100 which includes a product synthesizer 140, which receives information about specified interfaces such as input devices 102, output devices 104, network connectivity devices 106, and sound devices 108. When selected, the functional blocks associated with each interface may be arranged using mechanical layout tool 110, for example to orient a display, camera, input switch, or other interface device onto a particular surface or location of the IoT device being designed. Constraints may also be entered to optimize particular parameters for particular applications. Examples of constraints include power constraints 114, performance constraints 116, and mechanical or packaging constraints 112.

Each selected interface and core system has an associated set of attributes such as a schematic symbol, PCB footprint and symbol, mechanical 3D model, and software API interface which is specific to that particular interface. For example, a mechanical pushbutton switch input device 102 would have as attributes a schematic symbol, PCB symbol, an API for the subsequently written program to act on this input, which could be a general purpose input/output (GPIO) pin on the CPU. By contrast, a touch screen with a button which is displayed on a display below the touch screen would require a touch screen interface schematic symbol, and the software API would provide the means for placement of displayed soft keys and detection of touch to the displayed button, with the touchscreen input and display output being provided to the CPU using any physical interface type.

FIG. 1 shows an example set of interfaces and constraints for identifying product features and constraints. When the last constraint and interface is specified, the product synthesizer 140 processes the requested interfaces and constraints and generates output files 118, which include PCB fabrication files, a schematic showing the interconnects, a bill of materials identifying the materials to be purchased, mechanical packaging files, an optional 3D solid file for rapid fabrication with a 3D printer, and an API for program development including optional firmware for development of the product using drivers which are resident in flash memory of the CPU. The product synthesizer database includes, for each selected core system and interface, the required software driver or control interface provided in a source or compiled form identified for each interface so that each software driver is included in the API for software development, and only the software drivers for the selected interfaces consume program memory, rather than the superset of drivers which commonly accompany a family of devices.

Input interface devices may include any device which includes an interface for reading an analog input, digital input, or any input which may be coupled to the CPU through a physical interface. Input interface devices may also include devices or sensors which generate a voltage to be read by the CPU using an existing interface, such as an analog voltage or output voltage from a sensor which is coupled to an available analog input pin for a CPU with an integrated ADC, or the voltage may be coupled to an external ADC which is coupled to the CPU via a dedicated or commonly shared SPI, I2C, or SDIO interface bus. Other input interfaces include a touchscreen, a microphone, sound source, or a variable control input such as from a variable resistor in a voltage divider.

Output interface devices may include any device which generates an analog output, digital output, PWM output, GPIO output, open collector output, FET driver output, actuator output, or any output known in the prior art, either as a voltage output or a responsive device which acts on the output applied to it. Output interface devices may also generate an output voltage or current for use by another device, such as a motor driver for an external motor (which would typically be provided by the product synthesizer in the form of a PWM or other voltage delivered to a header for connection to a cable leading to the external motor), or more commonly, the output interface device could be an output device such as a display or actuator.

Certain interface devices may support simultaneous input/output operation, such as network interface adapters (WLAN, Bluetooth, Zigbee, or other wireless adapter, or wired adapters such as serial rs-232 ports or ethernet ports such as those conforming to the IEEE 802.3 standard.

It is also possible to provide interfaces which are adapted to existing interface standards, for example, libraries of Arduino shields, Raspberry Pi interface boards, or any prior art standardized interface which may be reduced to a schematic netlist and placed into the database of the current invention for use as a selectable interface.

Typically, an interface as represented in the database interface includes a schematic and netlist which resolves the input device to an interface bus that may be coupled to an interface type supported by the selected CPU, or a CPU will be selected which matches the selected interface bus type.

For example, a sensor may natively support I2C or SPI on the integrated circuit, so the schematic and netlist for this interface will typically comprise the sensor only. Alternatively, if the sensor generates an analog output not supported by the CPU, or multiple sensors are selected which each generate an analog output, one possible solution would be for the product synthesizer to generate a netlist and schematic which includes the selected sensors being input to an analog to digital converter (ADC) which generates an SPI or I2C interface. In this manner, the various selected interfaces may be reduced to a common interface (SDIO, I2C, SPI) and all connected to a common interface bus.

FIG. 2A shows an example base system 200, which includes a selected CPU 202 with built-in random access memory and flash memory. A power source and power distribution 204 is also part of the base system, and the power distribution includes the generation of particular voltages which may be required by selected interfaces after identification of these interfaces. It is common, for example, for a CPU to have a core voltage of 1.2 or 1.8V, and IO voltage of 2.5 or 3.3V, each of which would require a voltage regulator for generation of the required voltage, and the interfaces may similarly require core and interface voltages which would be provided by the power source and distribution. CPU 202 is selected by the product synthesizer from one of many available CPUs based on memory requirements, flash requirements, power dissipation, and performance level. Similarly, the power source and distribution 204 is selected by the product synthesizer based on power constraints and other criteria which may be specified. For example, for identification of a battery powered constraint, the product synthesizer would generate a base system 200 where power source and distribution 204 include a voltage regulator and charging system for the battery, and the battery size would be determined after the system interfaces and load were computed, the battery size determined by hours of life required by the application and provided by user constraints and inputs to the product synthesizer. The type of voltage regulator may be governed by a cost vs efficiency metric. For example, it is known that a switching voltage regular provides greater efficiency and longer battery life at somewhat greater expense than a linear regulator. Another constraint for a battery powered device may be whether the battery is rechargeable or replaceable. Alternatively, a mains powered device could result in the provision of a micro-USB connector and wall-powered charger, with associated voltage regulator power distribution for a CPU selected for minimum cost (if no power constraint or performance constraint were provided). Interfaces in FIG. 2 are shown in dashed outline as optional additions to CPU 202, each interface device optionally operative on a different physical interface type (SPI, SDIO, GPIO) depending on performance requirements or device requirements. A camera interface, for example, could be interface to an SDIO interface for maximum speed, or a GPIO interface for minimum cost, as specified in the associated constraints. Input interfaces 210 may be any of the types selected in block 102 of FIG. 1, output interfaces 212 may be any of the types selected in block 104 of FIG. 1, Bluetooth interface 208 or WLAN interface 206 are from the selections made in network connectivity step 106 of FIG. 1. Other interface types are not shown in FIG. 2A, but are understood to be from among any interface selected in FIG. 1, and multiple types of interfaces of each type are allowable, with the likely increased input/output and interface speed burden resulting in the product synthesizer selecting a CPU 202 with a greater I/O capability matched to the number of interfaces desired. For low performance devices, a single interface type such as I2C may be sufficient, whereas for high performance devices, a PCI bus may be required. Other interface types may also be supported, and the interfaces shown are only for clarity and in understanding the scope of the invention.

Figure 2B:
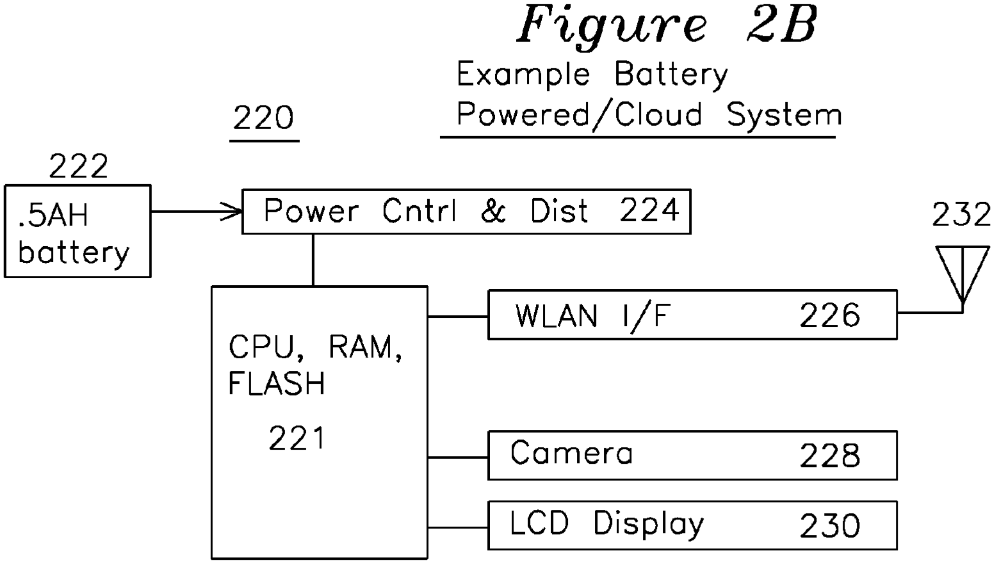
FIG. 2B is an example battery powered cloud based system.

FIG. 2B shows an example battery powered system which results from the selection in FIG. 1 of a battery powered system with a WLAN interface and cloud connectivity to a remote server, with selected interfaces including a camera 228, LCD display 230, and WLAN interface 226 with cloud connectivity over a WLAN to a remote server (not shown) for image upload and storage. In this example, the product synthesizer 140 of FIG. 1 would generate output files corresponding to the system 220 of FIG. 2 which includes a camera input device 228 which is capable of periodically capturing an image, indicating that an image has been acquired on an LCD display 230, and verifying that the image was successfully stored on a cloud server which is accessed through the WLAN interface 226. Using the provided constraints and interfaces, the product synthesizer 140 generates the schematic files, PCB files, bill of materials, mechanical files for an enclosure which matches the requirement of the PCB and camera, and provides an API or drivers for software to be written to control the target device, using the high level calls provided for the WLAN TCP networking stack and networking services, camera frame capture, and other high level functions provided by the driver. In one example embodiment, the product synthesizer generates the software development library and API based on a power consumption constraint. For example, when a power savings constraint is given, the API may call for the WLAN interface to operate in a "beacon wakeup" mode, where the WLAN module synchronizes to a train of beacon frames from an remote access point, and only transmits and receives during windows around this beacon interval. Other interfaces may also support a powersave modes, which typically provides a tradeoff in power consumption against performance. The provided API would thereby include a software interface to the selected interfaces such as the camera, LCD, and WLAN interface, as well as support for remote server access through the cloud, and operate all of the interfaces in either a high performance, low latency mode, or in a low power consumption mode, according to the provided constraints. In this manner, a product which satisfies the user requirements may be quickly generated and software written in a much shorter interval and with fewer errors than in the prior art.

Figure 2C:
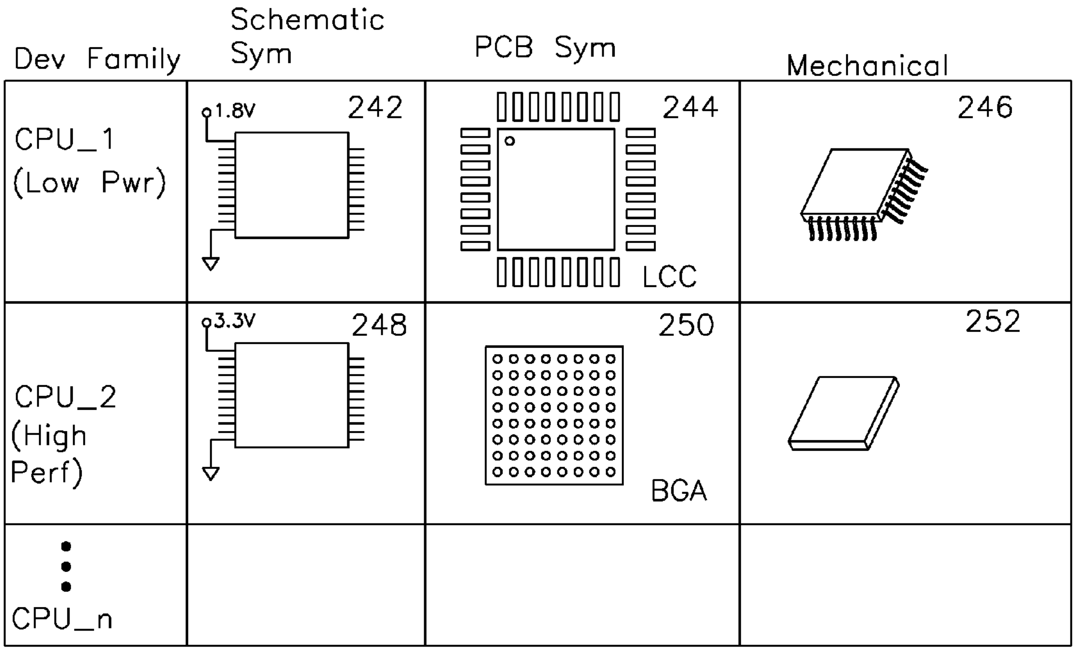
FIG. 2C is an example database for CPU devices.

FIG. 2C shows an example of a few of the attributes associated with a family of CPUs for a core system. A CPU_1 may be a low power CPU such as for periodically sending an informational packet associated with a static input switch, and CPU_2 may be a high power CPU for more demanding processing such as image capture and processing. CPU_1 may primarily support low speed SPI and GIPO interfaces, whereas CPU_2 may support higher speed interfaces such as SDIO and high speed SPI. Each CPU may have various packaging options, power options, and other attributes may be present but are not shown for clarity in the present examples of the invention. Each system core and interface has an associated set of schematic symbols and interface interconnects used in generating the schematic for a printed circuit board (PCB), a series of associated PCB symbols used for forming the lands on the PCB and indicating the extents of the IC when mounted on the PCB, a mechanical attribute which indicates a height or other parameter, a power requirement for sizing the power distribution including battery or power supply requirement, a cost (not shown), voltage and current requirements (not shown), and a power dissipation for sizing the enclosure to satisfy a power dissipation per area requirement, such that devices with a high power dissipation result in a greater enclosed volume of the enclosure.

Figure 2D:
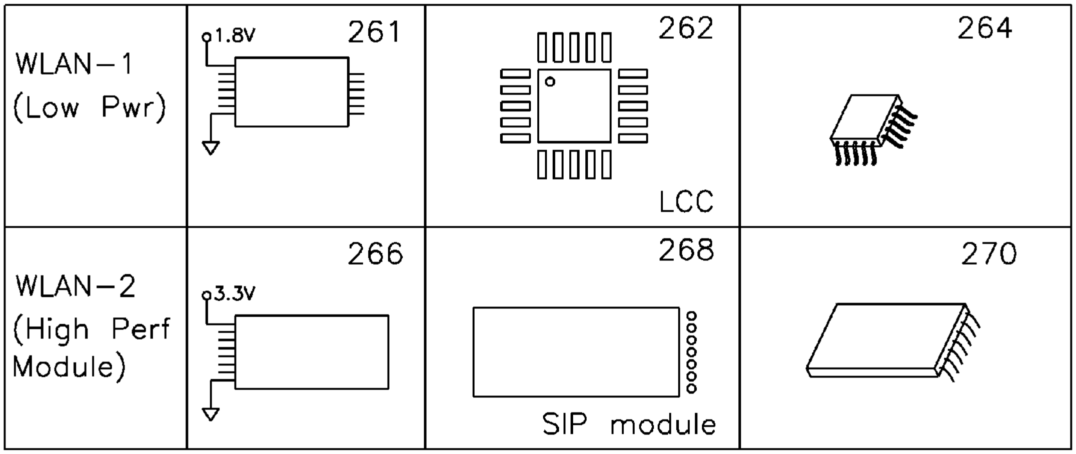
FIG. 2D is an example database for wireless local area network (WLAN) devices.

FIG. 2D shows a similar set of parameters for WLAN devices, such as a low power/high performance WLAN interface device with associated schematic symbol 261/266, PCB footprint 262/268, and mechanical package 264/270, as well as any other parameters which may be part of the attribute database for each particular class of interface. Each interface may further comprise a schematic which comprises a plurality of associated PCB symbols and interconnects including an unconnected interface port (such as SPI, SDIO, or GPIO) which the product synthesizer couples to the associated SPI, SDIO, or GPIO interface of the core system which was selected by the product synthesizer. If the product synthesizer determines that the interface capability of the system core is exceed by the interfaces which are attached, the product synthesizer selects a CPU with an additional interface bus to prevent excessive loads on the CPU bus.

Figure 3A:
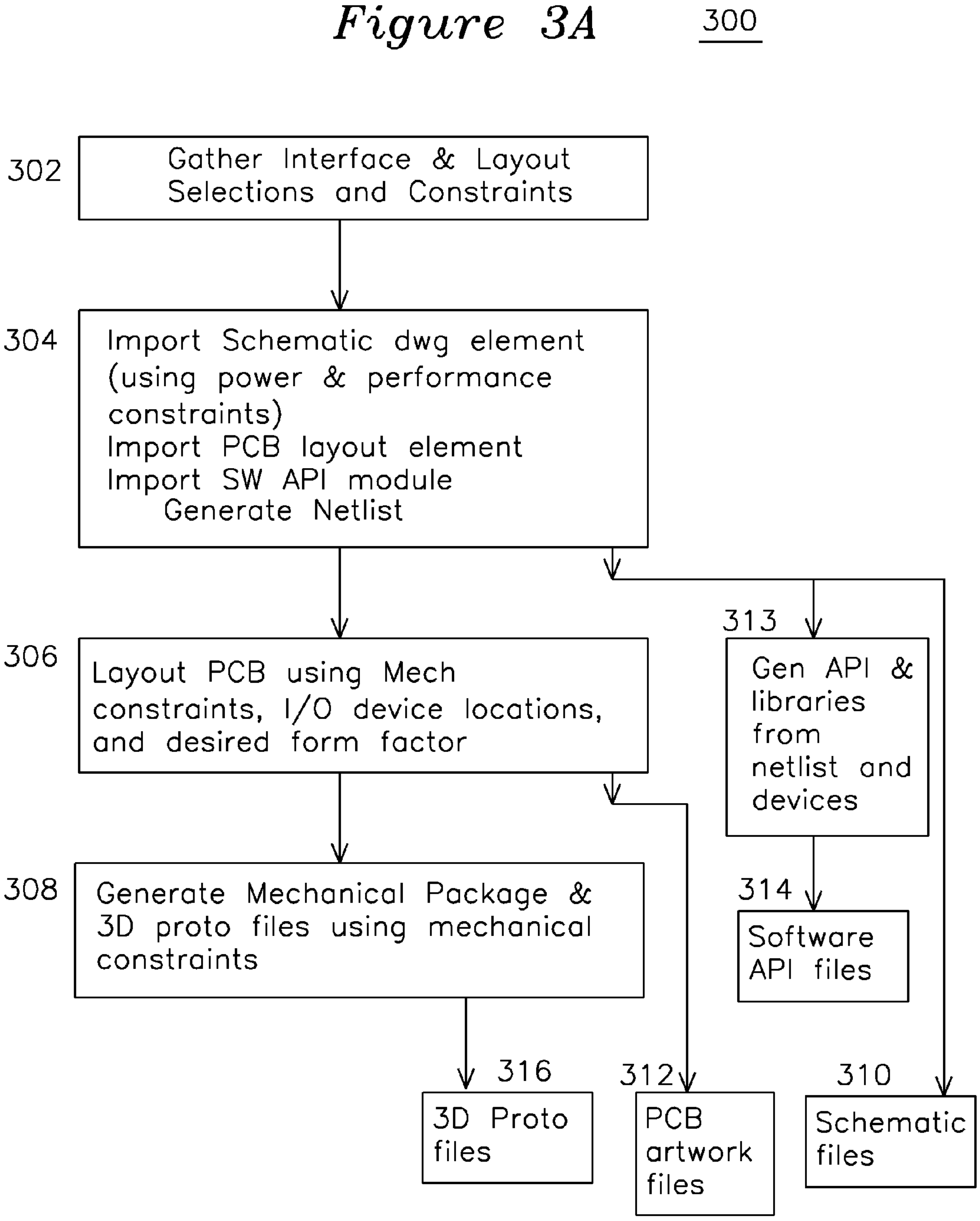
FIG. 3A is a flowchart for a design flow according to one example of the invention.

FIG. 3A shows a flowchart for one example of operation for product synthesizer 140 of FIG. 1. Step 302 gathers interface selections (such as the selections of 102, 104, 106, 108, and 110 of FIG. 1) and constraints (such as 112, 114, and 116). In one embodiment of the invention, the power constraints 114 result in an initial selection of base system power control and distribution 204 and the interface number and type result in an initial selection of CPU 202 with associated RAM and flash memory, and each interface selection results in connection of that interface to the CPU 202, either through a common bus, or through a dedicated interface. With the interfaces identified in step 304 and initial CPU and power distribution selections made, and using the interface mechanical layout information from step 110 of FIG. 1, schematic diagram files 310 and netlist files used by the PCB router are generated. The netlist files are next provided to a printed circuit board router which generates a physical placement of all of the components on the PCB using the PCB symbols associated with the interface, each located according to constraints provided in FIG. 1 (such as an interface layout specification step indicating where selected buttons, indicators, displays, and sound devices should be located). In a routing step 306, interconnecting traces are added to provide electrical connections between the pads of the PCB symbols previously placed for each selected interface device. After the PCB routing is completed, PCB layer artwork and drill files 312 are generated, and the resulting PCB dimensions and mechanical requirements are provided in step 308 to a mechanical packaging step which is performed, thereby providing an enclosure which includes apertures for any display or interface device type which requires such apertures or other mechanical features, and accommodates any selected power input jack or battery which has been sized for the device by the product synthesizer.

Concurrent with the netlist, software drivers or API modules are generated for subsequently software development which provides a programming interface to control each device according to its capabilities. The generated API may also include high level functions associated with each interface device. In the case of a WLAN modules, these may include a protocol stack for WLAN association and DHCP address assignment, or other services such as a secure shell (ssh) client, an HTML server, a database server, cloud networking connectivity, or any other high level services as required.

Figure 3B:
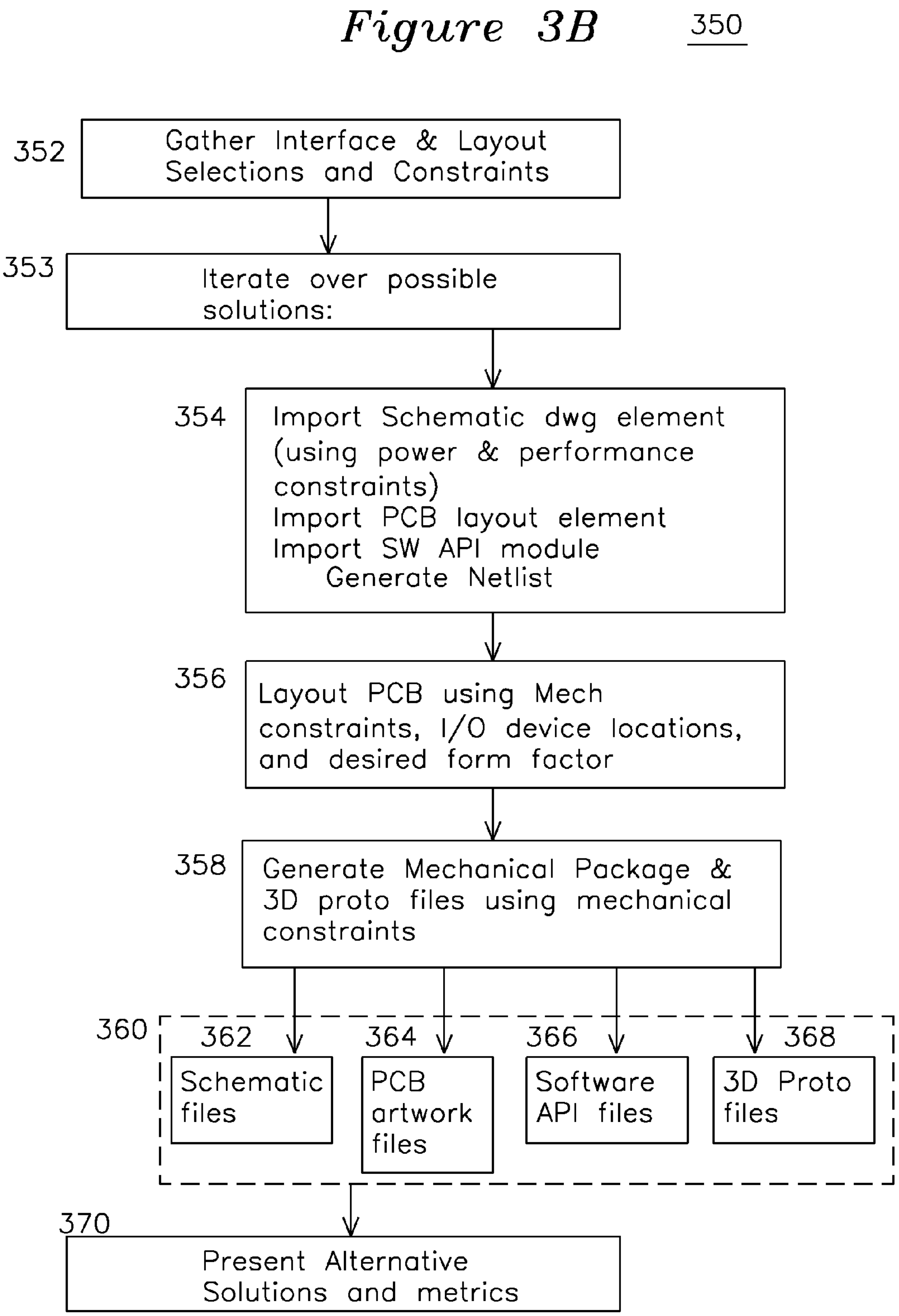
FIG. 3B is a flowchart for a design flow according to another example of the invention.

FIG. 3B shows another example similar to FIG. 3B, however the product synthesizer iterates over possible alternate solutions and presents an array of those for comparison of physical size, power dissipation, performance, cost, or any other required parameter. As in FIG. 3B, the product synthesizer steps include gathering interface and layout selections and constraints in step 352, however the subsequent steps are iterated to explore various solutions. The iterated steps may include the netlist generation step 354 from the interfaces or core systems which satisfy the originally presented constraints, the PCB layout step 356, and the mechanical packaging step 358, which results in a particular iteration result 360 in the form of schematic files 362, PCB artwork files 364, software drivers and APIs 366, and 3D prototype files 368, as were previously generated. Each of these results is presented in step 370 as an alternate solution for consideration by the designer.

FIG. 4A shows an example database entry, which includes a component type (interface or core system), the associated interconnected schematic symbols, PCB symbols, mechanical model, various voltages and currents generated or required, and interface requirements.

FIG. 4B shows an example alternative 1 for the previously described system of FIG. 2B comprising a core system (CPU1), camera (CAM1), LCD display (DSP1), and WLAN (WLAN1), each of which has various parameters of interest. The completed alternative 1 system shows a total cost of $41.75 for a camera with 640×480 resolution, and a maximum throughput of 10 Mbps limited by the camera output data rate. FIG. 4C shows an alternative which requires a different camera CAM1 and higher speed WLAN (WLAN2), which provides a throughput of 22 Mbps using a different type of interface on the same CPU1, and with the camera CAM2 having a resolution of 1300×732 with an additional $7.50 in materials cost.

Figure 5A:
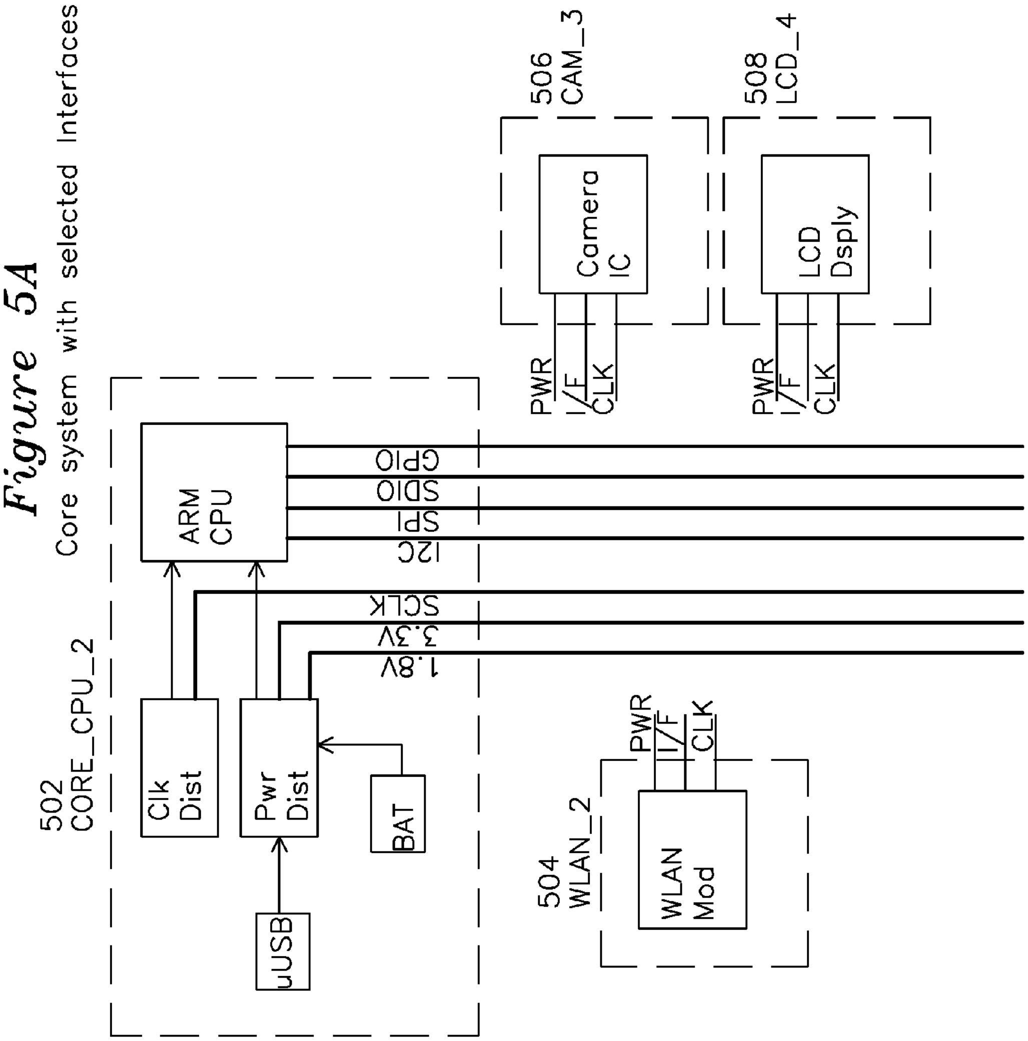
FIG. 5A is a block diagram for an example core system with selected interfaces

FIG. 5A shows an example core system 502 with selected WLAN interface 504 (a WLAN module WLAN 2 from several available WLAN modules, selected based on constraints or by user selection), a selected camera interface 506 (also selected based on constraints such as image resolution), and a selected LCD display 508 (selected based on user constraints or by user selection). Each of the core system 502 and interfaces 504, 506, 508, may have a variety of alternatives (not shown), each alternative having a different characteristic. For example, each interface or core system alternative may include a different physical interface bus type, a different voltage requirement, or a different clock requirement. The product synthesizer selects the best fit alternatives for each of 502, 504, 506, and 508 based on either a performance metric or a cost metric, as specified in the constraints described in FIG. 1. One type of alternative may be the interface type (shown generically as I/F for each of the interfaces of FIG. 5A), and the product synthesizer may select alternatives which match a shared hardware bus, or it may select an alternative which maximizes a required performance using different busses. For example, a lowest cost metric may use devices which only support the low speed SPI or I2C, with the devices shared on the same bus, thereby limiting the maximum throughput for each device.

Figure 5B:
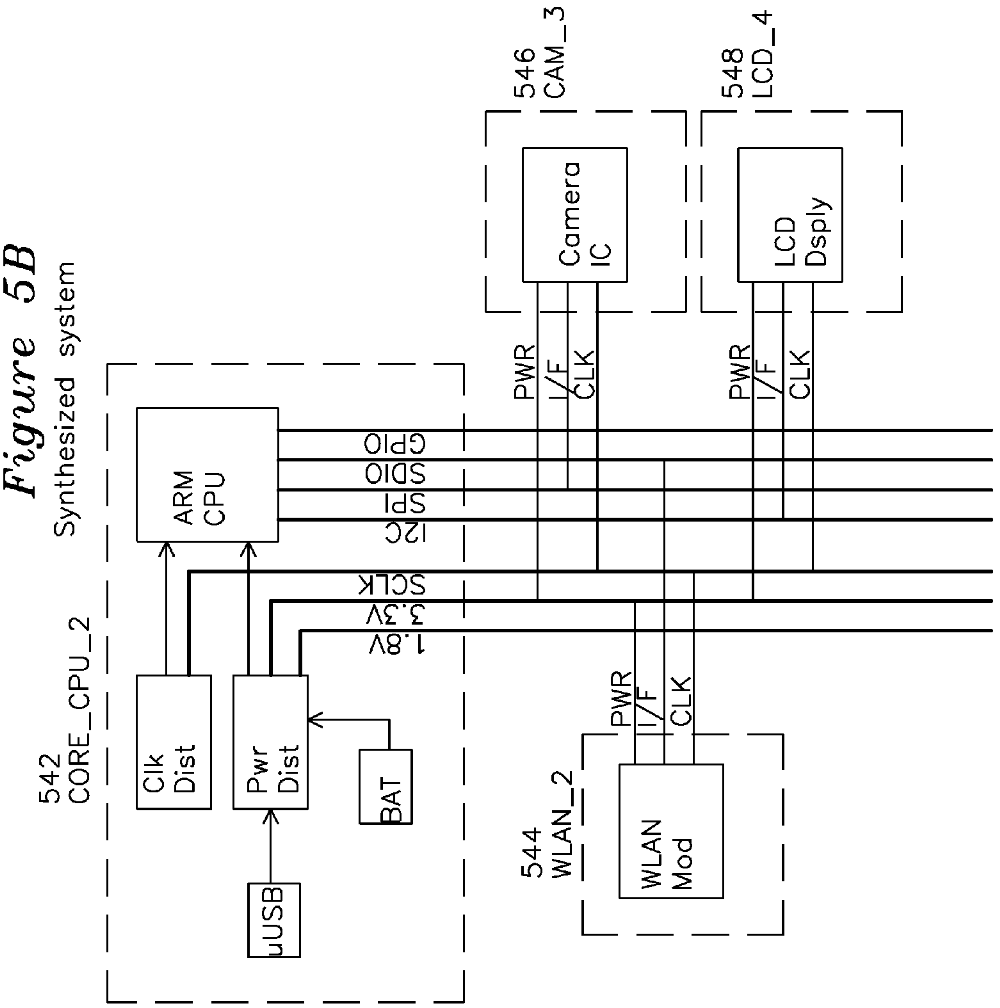
FIG. 5B is a block diagram for an example synthesized system.

FIG. 5B shows an example product synthesizer result where the result optimizes for performance, with each interface being connected to a separate interface, with the WLAN module 544 selected for high performance with an SDIO bus and connected to the high speed SDIO bus of core system 542, the camera selected for high performance with an SPI interface bus and connected to the SPI bus of the core system 542, and the LCD display 548 using an I2C bus and connected to the I2C bus of the core system 542. In a low cost system, all of the interfaces may be coupled to an SPI bus shared across all devices, and the core system 542 selected would have no SDIO bus or SPI bus for nominal cost or power savings.

Each of the alternatives for the block diagram core CPU 502, and block diagram interfaces 504, 506, and 508 of FIG. 5A have a plurality of individual components (schematic symbol and associated PCB symbol) interconnected in a netlist for each separate core CPU system and each interface, and with each alternative having a similar construction and separate database entry, as was described for FIGS. 4A, 4B, and 4C. After the product synthesizer has selected the particular CPU core system and interfaces on a constraint basis, as shown in FIG. 4A, the netlists for the CPU core and the interfaces are joined at the interface layer (in one example, power, bus, and clocking) to form a single schematic and a single netlist for the system which was synthesized from the selected constraints, interfaces, and system core. This single netlist is then placed and routed, using the mechanical constraints or user input for component and interface placement, as was described previously.

The proceeding has been a description of the preferred embodiment of the invention. It will be appreciated that deviations and modifications can be made without departing from the scope of the invention, which is defined by appended claims.

We claim:

1. A product synthesis process for generation of an electronic system, the electronic system having a power source selected from a family of power sources, each possible power source having a cost/size/performance attribute, the electronic system also having power distribution, system clock distribution, and a CPU selected from a family of CPUs, each CPU in said family of CPUs having a cost attribute, size attribute, and performance attribute, each possible CPU also having connectivity to at least one interface, the product synthesis process comprising:

an interface selection step for the selection of one or more interfaces, each interface having an associated schematic symbol, a PCB symbol, a mechanical model, a cost attribute, size attribute, and performance attribute, each interface having an interface type which matches the available connectivity of said CPU interface type;

a constraint identification step for the selection of one or more constraints, including the identification of a power source type, and an optional performance requirement, cost requirement, or low power requirement, each constraint having a weight which indicates a relative importance;

a schematic generation step whereby a netlist describing the component interconnects is generated from said selected CPU, said selected power source, and said selected interface;

a printed circuit board (PCB) placement step whereby PCB symbols associated with each said selected interface and said selected CPU are provided in a proposed PCB placement for rearrangement according to a user requirement;

a PCB routing step whereby electrical connectivity is provided for said PCB using interconnecting traces on said PCB;

a mechanical packaging step whereby mechanical enclosure files are generated, said mechanical enclosure files describing an enclosure which accommodates and provides mounting for the printed circuit board of said PCB placement step, said mechanical enclosure files describing one or more apertures positioned in a corresponding locations identified in said mechanical model for each said interface;

an API generation step whereby an application program interface is generated which enables a program written for said CPU to access or control at least one of said interfaces;

an optimization step operative on a weighted constraint for each of cost, size, and performance, and iteratively performed whereby the associated cost metric, size metric, and performance metric are multiplied by an associated constraint weight, thereby providing each possible unique combination of selected CPU, selected interface, and said mechanical enclosure with a final metric based on the application of said weighted constraints, thereafter presenting a candidate design based on a best final metric.

2. The product synthesis process of claim 1 where at least one said interface type is at least one of: SDIO (secure digital input/output), Serial Peripheral Interface (SPI), general purpose input/output (GPIO), or a shared bus.

3. The product synthesis process of claim 1 where said interface selection includes input interfaces.

4. The product synthesis process of claim 3 where said input interfaces include at least one of: a switch, a soft button for use with a touchscreen, a touchscreen, a microphone, a sound source, a sensor input, an analog input coupled to an analog to digital converter (ADC), or a variable control.

5. The product synthesis process of claim 1 where said interface selection includes output interfaces.

6. The product synthesis process of claim 5 where said output interfaces include at least one of: a display, an actuator output, a relay, an open collector output, a driven output, or a pulse-width-modulated (PWM) output.

7. The product synthesis process of claim 1 where said interface selection includes a network connectivity interface.

8. The product synthesis process of claim 7 where said network connectivity interface includes at least one of a wireless local area network (WLAN), a wireless ZigBee interface, a Bluetooth interface, or an Ethernet interface.

9. The product synthesis process of claim 1 where said mechanical packaging step includes the identification of placement location of at least one input device, output device, or network connectivity device.

10. The product synthesis process of claim 1 where said constraint identification step include the identification of an external power source or an internal power source, each said external power source or said internal power source having an associated schematic and netlist which is added to said electronic system.

11. The product synthesis process of claim 1 where said optional performance requirement includes the identification of a battery life parameter which, in combination with the requirements of said electronic system and said selected interfaces, results in the selection of a battery type and capacity.

12. A product synthesis process operative on a base system, a plurality of selected interfaces, and at least one constraint including cost, size and performance, each said interface having an associated schematic, netlist, material cost, size, and performance metric, said product synthesis process selecting a base system from said at least one constraint, said base system including initial selections for each of a CPU, a clock distribution, a power source, and power distribution, said CPU having at least one interface attachment bus; said product synthesis steps comprising:

associating each said interface with said at least one CPU interface attachment bus, forming a netlist from said base system and interfaces;

determining a position on a printed circuit board (PCB) for each said PCB component of each said interface and said base system during a placement step;

determining trace routes according to said netlist of said printed circuit board during a routing step;

determining an enclosure from a mechanical constraint and the extents of said printed circuit board;

forming an application program interface (API) by instantiating a driver for each interface with a driver for said base system;

providing a candidate design including said netlist, a schematic derived from said netlist, said PCB placement and routing, said enclosure, and metrics for said candidate design including at least a cost and a performance;

forming a group of candidate designs by iterating over alternate base systems and alternate interfaces which satisfy said constraints;

selecting a subset of said candidates based on a weighted metric combining a cost metric, performance metric, or a size metric;

optimizing to a best overall selection operative on a weighted constraint for each of cost, size, and performance, said optimization iteratively performed whereby the associated cost metric, size metric, and performance metric is provided for a plurality of unique combinations of selected CPU, selected interface, and said enclosure to select a configuration having a closest match based on multiplying each cost metric, size metric, and performance metric by said associated constraint weight to arrive at a final metric for each configuration, thereafter selecting the configuration with a best final metric.

13. The product synthesis process of claim 12 where said CPU interface attachment bus is at least one of: secure digital input/output (SDIO), serial peripheral interface (SPI), general purpose input/output (GPIO), or a data bus shared by a plurality of other interfaces.

* * * * *